(12) United States Patent
Park et al.

(10) Patent No.: US 9,164,672 B2
(45) Date of Patent: Oct. 20, 2015

(54) IMAGE DISPLAY DEVICE AND METHOD OF MANAGING CONTENTS USING THE SAME

(75) Inventors: Hyorim Park, Seoul (KR); Dami Choe, Seoul (KR)

(73) Assignee: LG Electronics Inc., Seoul (KR)

( * ) Notice: Subject to any disclaimer, the term of this patent is extended or adjusted under 35 U.S.C. 154(b) by 1071 days.

(21) Appl. No.: 13/169,865

(22) Filed: Jun. 27, 2011

(65) Prior Publication Data

US 2012/0266093 A1     Oct. 18, 2012

(30) Foreign Application Priority Data

Apr. 18, 2011   (KR) ........................ 10-2011-0035632

(51) Int. Cl.

| | |
|---|---|
| G06F 3/0486 | (2013.01) |
| G06F 3/14 | (2006.01) |
| G06F 3/0488 | (2013.01) |
| H04N 21/41 | (2011.01) |
| H04N 21/61 | (2011.01) |
| G06F 3/0484 | (2013.01) |
| H04W 4/00 | (2009.01) |
| H04W 88/02 | (2009.01) |
| H04M 1/725 | (2006.01) |
| G09G 5/14 | (2006.01) |

(52) U.S. Cl.
CPC .......... *G06F 3/0486* (2013.01); *G06F 3/04886* (2013.01); *H04N 21/4122* (2013.01); *H04N 21/4126* (2013.01); *H04N 21/6112* (2013.01); *H04N 21/6125* (2013.01); *H04N 21/6175* (2013.01); *G06F 3/0484* (2013.01); *G06F 3/1454* (2013.01); *G09G 5/14* (2013.01); *H04M 1/72527* (2013.01); *H04W 4/00* (2013.01); *H04W 88/02* (2013.01)

(58) Field of Classification Search
CPC .... H04M 1/72527; H04W 4/00; H04W 88/02
USPC .................. 715/769, 781, 764, 804, 847, 740
See application file for complete search history.

(56) References Cited

U.S. PATENT DOCUMENTS

| | | | | |
|---|---|---|---|---|
| 5,850,599 | A | * | 12/1998 | Seiderman ..................... 455/406 |
| 5,920,826 | A | * | 7/1999 | Metso et al. ................... 455/557 |
| 5,999,190 | A | * | 12/1999 | Sheasby et al. ............... 345/589 |
| 6,072,486 | A | * | 6/2000 | Sheldon et al. ............... 715/835 |
| 6,198,915 | B1 | * | 3/2001 | McGregor et al. ............ 455/406 |
| 6,546,262 | B1 | * | 4/2003 | Freadman ..................... 455/557 |
| 6,857,105 | B1 | * | 2/2005 | Fox et al. ....................... 715/825 |
| 7,134,094 | B2 | * | 11/2006 | Stabb et al. .................... 715/827 |
| 7,805,146 | B1 | * | 9/2010 | Beyer, Jr. ................... 455/456.1 |
| 7,835,505 | B2 | * | 11/2010 | Toyama et al. ............ 379/90.01 |
| 7,933,632 | B2 | * | 4/2011 | Flynt et al. ................. 455/569.1 |
| 7,945,244 | B1 | * | 5/2011 | Delaet et al. ................... 455/411 |
| 8,401,681 | B2 | * | 3/2013 | Rosenblatt et al. ............. 700/94 |
| 8,429,546 | B2 | * | 4/2013 | Hilerio et al. ................. 715/760 |
| 8,487,918 | B1 | * | 7/2013 | Nelissen et al. .............. 345/204 |
| 8,639,214 | B1 | * | 1/2014 | Fujisaki ........................ 455/406 |

(Continued)

FOREIGN PATENT DOCUMENTS

EP             2302515      *    8/2010             G06F 9/46

*Primary Examiner* — Ece Hur

(74) *Attorney, Agent, or Firm* — Birch, Stewart Kolasch & Birch, LLP

(57) ABSTRACT

An image display device and a method of managing contents using the same that can enable the user to quickly access wanted (or selected) contents, when using the contents of the image display device and the mobile terminal, thereby enhancing user convenience.

22 Claims, 11 Drawing Sheets

(56) References Cited

U.S. PATENT DOCUMENTS

| | | | |
|---|---|---|---|
| 2002/0122076 A1* | 9/2002 | Nakaki | 345/847 |
| 2003/0158927 A1* | 8/2003 | Sagey et al. | 709/223 |
| 2003/0222913 A1* | 12/2003 | Mattila et al. | 345/764 |
| 2004/0066414 A1* | 4/2004 | Czerwinski et al. | 345/781 |
| 2004/0184773 A1* | 9/2004 | Lim et al. | 386/46 |
| 2005/0051623 A1* | 3/2005 | Okuda et al. | 235/384 |
| 2005/0125736 A1* | 6/2005 | Ferri et al. | 715/747 |
| 2005/0238046 A1* | 10/2005 | Hassan et al. | 370/465 |
| 2006/0063539 A1* | 3/2006 | Beyer, Jr. | 455/456.3 |
| 2006/0161889 A1* | 7/2006 | Stabb et al. | 717/113 |
| 2006/0259942 A1* | 11/2006 | Toyama et al. | 725/133 |
| 2006/0287012 A1* | 12/2006 | Lan | 455/575.1 |
| 2007/0083827 A1* | 4/2007 | Scott et al. | 715/811 |
| 2007/0157099 A1* | 7/2007 | Haug | 715/769 |
| 2007/0226636 A1* | 9/2007 | Carpenter et al. | 715/751 |
| 2008/0108386 A1* | 5/2008 | Hard | 455/557 |
| 2008/0320390 A1* | 12/2008 | Semple et al. | 715/700 |
| 2009/0034450 A1* | 2/2009 | Urner | 370/328 |
| 2009/0117890 A1* | 5/2009 | Jacobsen et al. | 455/419 |
| 2009/0132923 A1* | 5/2009 | Han et al. | 715/717 |
| 2009/0160641 A1* | 6/2009 | Stanners et al. | 340/539.13 |
| 2009/0197586 A1* | 8/2009 | Vargas et al. | 455/419 |
| 2009/0253408 A1* | 10/2009 | Fitzgerald et al. | 455/411 |
| 2010/0235793 A1* | 9/2010 | Ording et al. | 715/863 |
| 2010/0257473 A1* | 10/2010 | Kang | 715/769 |
| 2011/0059769 A1* | 3/2011 | Brunolli | 455/556.1 |
| 2011/0061012 A1* | 3/2011 | Lim et al. | 715/769 |
| 2011/0219427 A1* | 9/2011 | Hito et al. | 726/3 |
| 2011/0225330 A1* | 9/2011 | Lavian et al. | 710/63 |
| 2011/0321071 A1* | 12/2011 | McRae | 725/5 |
| 2012/0131098 A1* | 5/2012 | Wood et al. | 709/203 |
| 2012/0254962 A1* | 10/2012 | Chen | 726/7 |
| 2012/0277000 A1* | 11/2012 | Vange | 463/37 |
| 2012/0282914 A1* | 11/2012 | Alexander | 455/420 |
| 2012/0311472 A1* | 12/2012 | Kim | 715/765 |
| 2013/0347117 A1* | 12/2013 | Parks et al. | 726/26 |
| 2015/0066941 A1* | 3/2015 | Martin | 707/741 |

\* cited by examiner (a)

(b)

(a)

(b)

(c)

(a)

(b)

(c)

(a)

(b)

IMAGE DISPLAY DEVICE AND METHOD OF MANAGING CONTENTS USING THE SAME

Pursuant to 35 U.S.C. §119(a), this application claims the benefit of the Korean Patent Application No. 10-2011-0035632, filed on Apr. 18, 2011, which is hereby incorporated by reference as if fully set forth herein.

BACKGROUND OF THE INVENTION

1. Field of the Invention

The present invention relates to an image display device and a method of managing contents using the same In addition, more particularly, to an image display device being connected to a mobile terminal (or user equipment), so as to communicate with the mobile terminal, and a method of managing contents stored in the mobile terminal by using the image display device.

2. Discussion of the Related Art

With the recent development in the mobile communication technology, users are now capable of accessing the internet by using image display devices, such as televisions. An image display device may be connected to a mobile or portable terminal, such as a mobile phone or a tablet computer, via wired or wireless connection. Thus, data communication between the image display device and the mobile terminal can be performed through such connection.

Furthermore, the above-described mobile terminal is configured to have the form of a multimedia player having multiple functions, such as executing applications, filming (or recording) and playing-back photos (or still images) or moving pictures, playing-back music or moving picture files, playing games, receiving broadcast programs, and so on. Due to such interactive data communication between the image display device and the mobile terminal, contents stored in any one of the image display device and the mobile terminal may be displayed on or stored in its counterpart. Accordingly, in using the contents stored in any one of the image display device and the mobile terminal, an image display device and a method of managing contents using the same considering the user's convenience is required to be developed.

SUMMARY OF THE INVENTION

Accordingly, the present invention is directed to an image display device and a method of managing contents using the same that substantially obviate one or more problems due to limitations and disadvantages of the related art.

Another object of the present invention is to provide an image display device and a method of managing contents using the same that can enable the user to quickly access wanted (or selected) contents, when using the contents of the image display device and the mobile terminal, thereby enhancing user convenience.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of managing contents using an image display device includes the steps of displaying a display screen of a mobile terminal being connected to and communicating with the image display device, or displaying a display screen of first contents stored in the image display device, on a first display screen of the image display device, displaying a Quick Access tray on a second display screen of the image display device, receiving a first user command for selecting the first contents or for selecting second contents stored in the mobile terminal, based upon the first user command, creating Quick Access items of the selected first contents or the selected second contents in the Quick Access tray, receiving a second user command for selecting the Quick Access item, In addition, based upon the second user command, displaying the first contents or the second contents corresponding to the selected Quick Access item on a third display screen of the image display device.

Also, in the step of displaying the first display screen, an image of the mobile terminal may be further displayed.

Also, the first user command may be defined as an input operation of dragging and dropping the first contents or the second contents to the Quick Access tray.

Also, the method of managing content using an image display device further includes receiving information on the second contents stored in a mobile terminal. Further, the mobile terminal is connected to and communicating with the image display device, and automatically creating Quick Access items of the first contents or the second contents in the Quick Access tray.

Also, the method of managing content using an image display device further includes receiving a third user command, In addition, based upon the third user command, deleting the Quick Access item, or changing a position of the Quick Access item, or changing a displayed size of the Quick Access item.

Also, the method of managing content using an image display device further includes realigning, expanding, or highlighting the Quick Access item depending upon a frequency of use of the corresponding Quick Access item.

Also, the method of managing content using an image display device further includes, when the first contents cannot be executed, or when the mobile terminal having the second contents stored therein cannot communicate with the image display device, indicating the Quick Access item of the first contents or the second contents as being in a non-active (or inactive) state.

The second user command may be defined as an input operation of dragging and dropping the Quick Access item to a screen of the mobile terminal displayed on the second display screen or to the third display screen.

Also, the method of managing content using an image display device further includes transmitting an execution screen of the first contents or the second contents corresponding to the Quick Access item from the mobile terminal processed with dragging and dropping.

Also, the method of managing content using an image display device further includes, when the second user command selects a Quick Access item of second contents indicated as being non-active, connecting the mobile terminal having the second contents indicated as being non-active to the image display device, so as to enable communication between the corresponding mobile terminal and the image display device.

Herein, the first display screen and the second display screen may be displayed on the third display screen in the form of on-screen displays (OSDs).

In another aspect of the present invention, an image display device includes a video output unit configured to display an image, an interface unit configured to transmit and receive data to and from a mobile terminal, the mobile terminal being connected to and communicating with the image display device, and to receive user commands, a storage unit configured to store first contents, and a control unit configured to control the video output unit based upon the user command received from the interface unit. Herein, the control unit may display a display screen of the mobile terminal or displays a display screen of the first contents, on a first display screen of the video output unit, and the control unit may control the video output unit so that a Quick Access tray can be displayed on a second display screen of the video output unit. Also, the interface unit may receive a first user command for selecting the first contents or for selecting second contents stored in the mobile terminal, In addition, based upon the first user command, the control unit may control the video output unit so as to create Quick Access items of the selected first contents or the selected second contents in the Quick Access tray. In addition, the interface unit may receive a second user command for selecting the Quick Access item and outputs the received second user command to the control unit, In addition, based upon the second user command, the control unit may control the video output unit so as to display the first contents or the second contents corresponding to the selected Quick Access item on a third display screen of the video output unit.

Also, the control unit may control the video output unit so that an image of the mobile terminal can be further displayed on the first display screen.

Also, the interface unit may receive the first user command by an input operation of dragging and dropping the first contents or the second contents to the Quick Access tray.

Also, the interface unit may receive information on the second contents stored in a mobile terminal. Further, the mobile terminal is connected to and communicating with the image display device, and may output the received information to the control unit, and the control unit may control the video output unit so that Quick Access items of the first contents or the second contents can be automatically created in the Quick Access tray.

Also, the interface unit may receive a third user command and may output the received third user command to the control unit, In addition, based upon the third user command, the control unit may control the video output unit so that the Quick Access item can be deleted, that a position of the Quick Access item can be changed, or that a displayed size of the Quick Access item can be changed.

Also, the control unit may control the video output unit, so that the Quick Access item can be realigned, expanded, or highlighted depending upon a frequency of use of the corresponding Quick Access item.

Also, when the first contents cannot be executed, or when the mobile terminal having the second contents stored therein cannot communicate with the image display device, the control unit may control the video output unit so that the Quick Access item of the first contents or the second contents can be indicated as being in a non-active (or inactive) state.

Also, the interface unit may receive the second user command by an input operation of dragging and dropping the Quick Access item to a screen of the mobile terminal displayed on the second display screen or to the third display screen.

Also, the control unit may control the interface unit so that an execution screen of the first contents or the second contents corresponding to the Quick Access item can be transmitted from the mobile terminal processed with dragging and dropping.

Also, the control unit may control the interface unit so that, when the second user command selects a Quick Access item of second contents indicated as being non-active, the mobile terminal having the second contents indicated as being non-active can be connected to the image display device, so as to enable communication between the corresponding mobile terminal and the image display device.

Finally, the control unit may control the video processing unit so that the first display screen and the second display screen can be displayed on the third display screen in the form of on-screen displays (OSDs).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within. In the following description of the present invention, suffixes "module" and "unit" that are used in the terms given to refer to the elements (or components) of the present invention are given or optionally used for the simplicity of describing the present invention. Therefore, it should be understood that the corresponding suffix itself will not be used to differentiate the definition or function of each element.

Examples of an image display device described in the description of the present invention may include all types of devices that can output (or display) images, such as televisions (TVs), personal computers (PCs), laptop computers, digital broadcast terminals, navigation devices, portable multimedia players (PMPs), personal digital assistants (PDAs), and so on.

Figure 1:
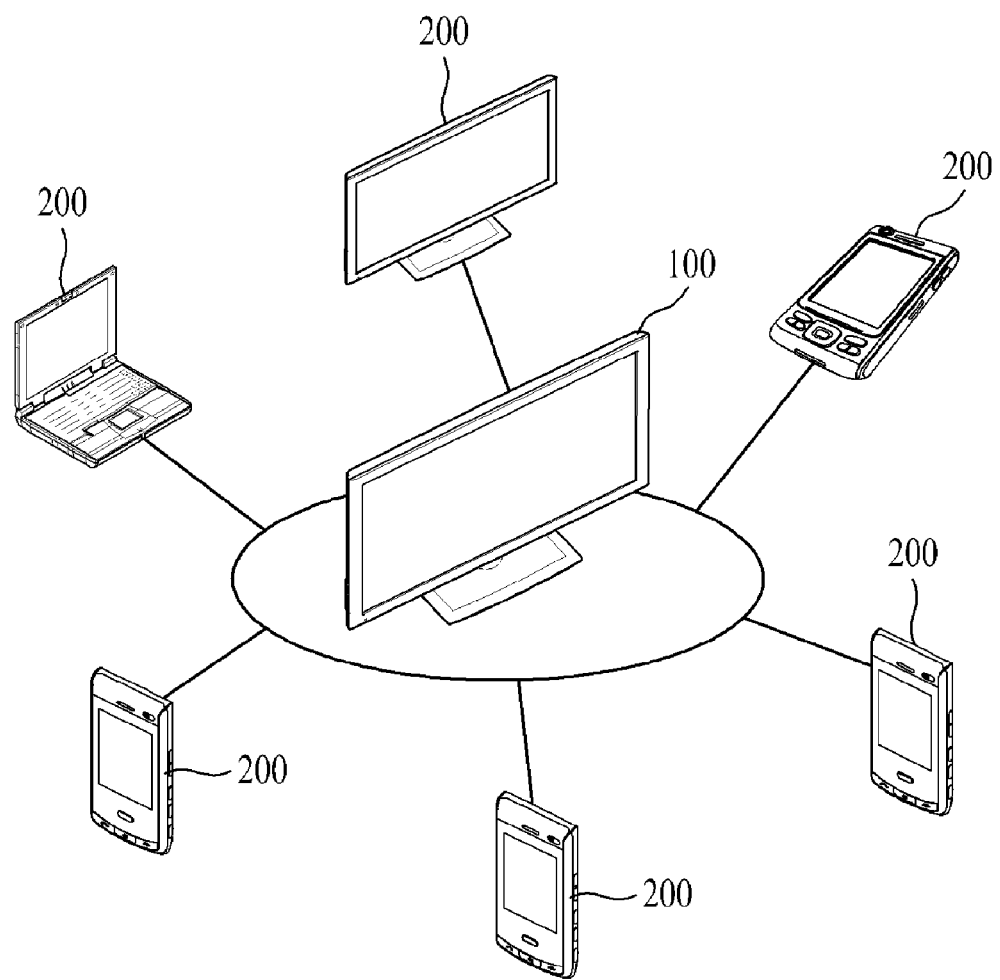
FIG. 1 illustrates an overall view of a contents management system having a method for managing contents according to an embodiment of the present invention applied thereto.

FIG. 1 illustrates an overall view of a contents management system having a method for managing contents according to an embodiment of the present invention applied thereto.

In a limited space (or area), such as the indoors of an office or home, communication between diverse devices may be performed through a wired or wireless close range (or short distance) communication network. For example, as shown in FIG. 1, a plurality of image display devices 100, such as TVs, PCs, laptop computers, and so on, that is available for interactive communication may exist within a limited space. In addition, a plurality of mobile terminals (or user equipments) 200, such as mobile phones, which can perform wireless communication with such image display devices, and smart phones may also exist within the same limited space. Additionally, a corresponding image display device 100 may also be connected to a social network service (SNS) server, an E-mail server, and other mobile user equipments that are located in remote areas via wired or wireless connection, so that the image display device 100 can communication with such servers and/or mobile terminals.

The method of managing contents according to the embodiment of the present invention provides a method enabling a user to execute and playback contents, which are stored in the mobile terminals 200 connected to and communicating with the image display device 100, or which are stored in the image display device 100 itself, more conveniently by using the above-described image display device 100. Also, in the description of the present invention, a set of contents refers to diverse information being provided through the internet or via computer communication. Herein, all types of multimedia data, such as various application programs including applications, moving pictures, still images (or photos), and so on, may be included as contents. Meanwhile, in the description of the present invention, a television will be given as an example of the image display device 100, and a smart phone will be given as an example of the mobile terminal 200 for simplicity.

Hereinafter, a method of managing contents according to an embodiment of the present invention that is realized in an image display device will now be described in detail with reference to FIG. 2 to FIG. 9.

Figure 2:
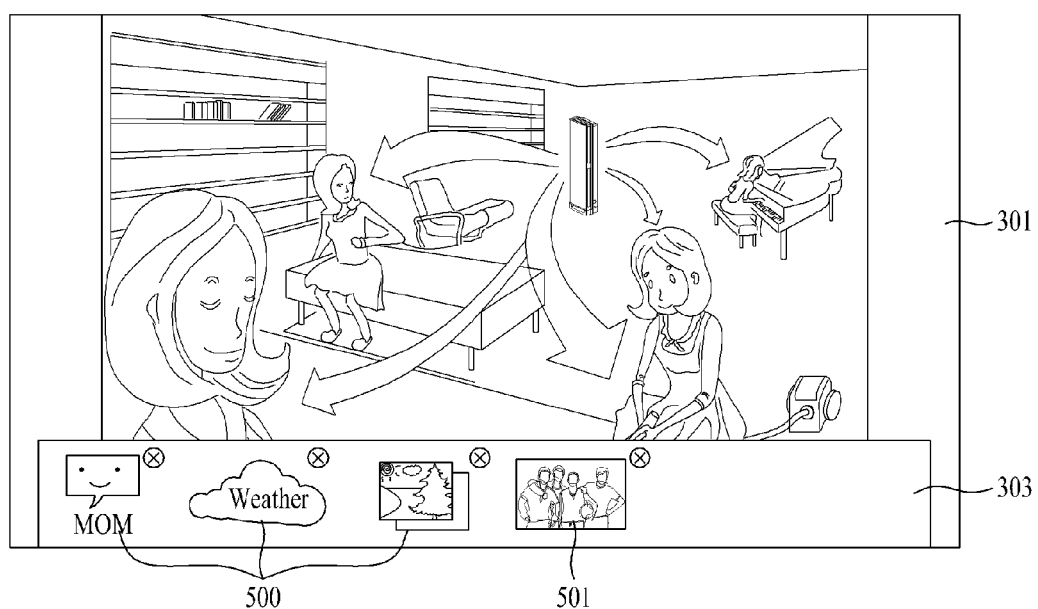
FIG. 2 illustrates a Quick Access tray displayed on an image display device according to an embodiment of the present invention.

For example, FIG. 2 illustrates a Quick Access tray displayed on the image display device 100 according to an embodiment of the present invention. That is, FIG. 2 shows a display screen that is being output from the image display device 100 according to an embodiment of the present invention. As shown in FIG. 2, the image display device 100 outputs a first display screen 301 corresponding to an image display screen of the image display device 100, and a second display screen 303 including a Quick Access tray. The Quick Access tray will also be referred to using reference numeral 303.

Examples of the first display screen 301 include a broadcast display screen, a moving picture, a still image (or photo or picture), an application execution screen, and so on that are output from the image display device 100. In addition, the Quick Access tray 303 (the second display screen 303) includes Quick Access items 500 corresponding to a first set of contents (hereinafter referred to as "first contents") stored in the mobile terminal 200 connected to the image display device 100, and/or Quick Access items 501 corresponding to a second set of contents (hereinafter referred to as "second contents") stored in the image display device 100.

In addition, the first set of contents includes all types of contents that can be played-back or executed by the mobile terminal 200 such as a movie, an application, web contents, and so on. In addition, the second set of contents includes all types of contents that can be played-back or executed by the image display device 100 such as a broadcast program, a movie, a picture (or photo), an application, and so on. Furthermore, the Quick Access items 500 and/or 501 correspond to connection or link information of a specific set of contents. Therefore, a user can directly playback or execute the respective set of contents through the Quick Access item 500 and/or 501. As shown in FIG. 2, the Quick Access items 500 and 501 can be displayed using icons.

The method of managing contents according to an embodiment of the present invention will now be described with respect to the Quick Access tray 303. More specifically, by using the Quick Access tray 303, the user can swiftly and efficiently execute or play-back the contents stored in the image display device 100 or the content stored in the mobile terminal 200 connected to the image display device 100.

Next, as a method of managing contents, creating or generating and executing the Quick Access tray 303 and diverse functions of the Quick Access tray 303 will be described in detail. Although the drawings illustrate an example where the first display screen 301 and the second display screen 303 are separately output, the second display screen 303 may be overlaid over the first display screen 301, or the first display screen 301 and the second display screen 303 may be output in the form of a Picture-In-Picture (PIP) screen. More specifically, the display order and display position of each of the first display screen 301 and the second display screen 303 may be realized in diverse forms.

Figure 3:
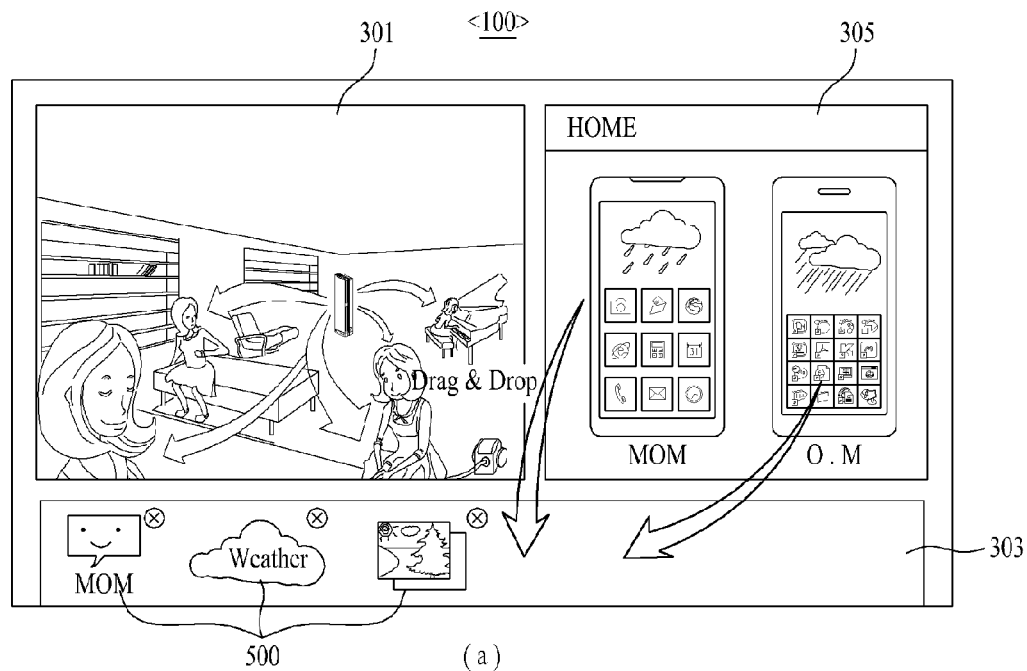
FIG. 3 illustrates an overall view showing an example of creating a Quick Access item in a Quick Access tray according to an embodiment of the present invention.
Figure 3:
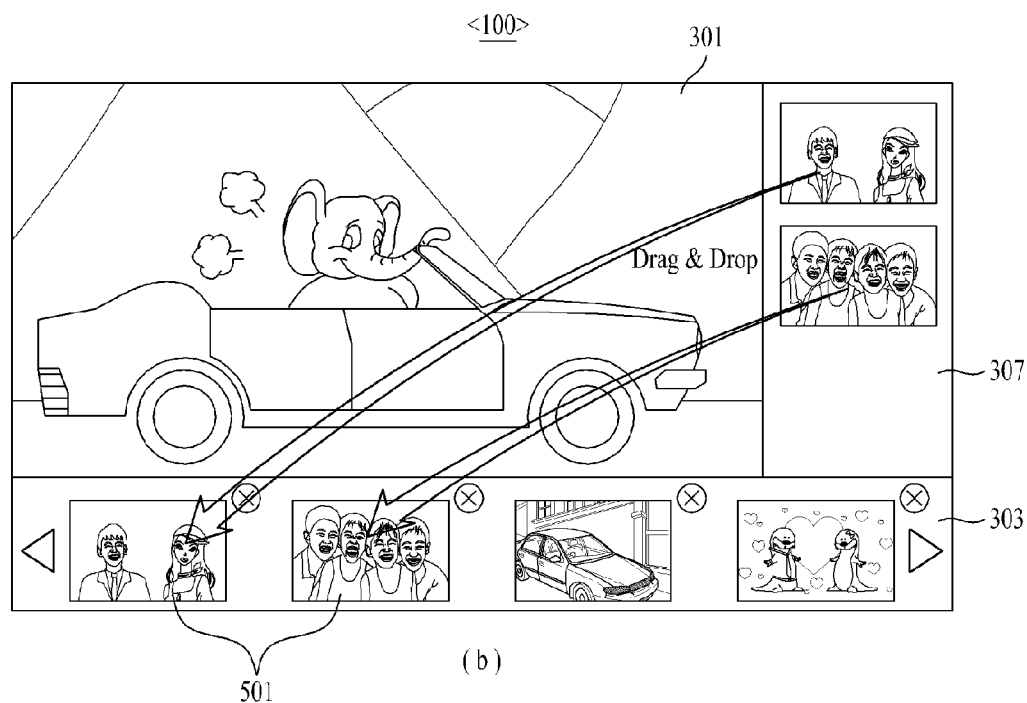

Turning now to FIG. 3, which illustrates an overall view of how to create the Quick Access item 500 and 501 in the Quick Access tray 303 according to an embodiment of the present invention. As described above, the Quick Access tray 303 includes the Quick Access items 500 and 501 displaying the first contents stored in the mobile terminal 200 and the second contents stored in the image display device 100.

In more detail, in order to create a corresponding Quick Access items 500 and 501 in the Quick Access tray 303, the image display device 100 first outputs information on the first contents stored in the mobile terminal 200 or information on the second contents stored in the image display device 100.

For example, FIG. 3(a) illustrates an example of creating the Quick Access items 500 of the first contents stored in the mobile terminal 200. In addition, FIG. 3(b) illustrates an example of creating Quick Access items 501 of the second contents stored in the image display device 100. As shown in FIG. 3(a), the image display device 100 can also display the first contents on a third display screen 305, which is separated from the above-described first and second display screens 301 and 303. In addition, as shown in FIG. 3(b), the image display device 100 can also display the second contents stored in the image display device 100 on a fourth display screen 307, which is also separated from the above-described first and second display screens 301 and 303.

A method for displaying the first contents will now be described in more detail with reference to FIG. 3(a). In more detail, the image display device 100 can search for a corresponding mobile terminal 200 that can intercommunicate with the image display device 100, either automatically or in accordance with a user command. At this point, when a mobile terminal 200 that is connected to the image display device 100 and capable of communicating with the image display device 100 exists, the image display device 100 performs the connection between the image display device 100 and the corresponding mobile terminal 200. Thereafter, the image display device 100 displays an image showing the connected mobile terminal 200 on the third display screen 305.

However, in this instance, depending upon the settings of each mobile terminal 200, a process of inputting a password for accessing the mobile terminal 200 may be used. Alternatively, when a user is already identified by the image display device 100, the settings may be made so that only the mobile terminals 200 belonging to the identified user, who is assigned with the access rights, may be connected to the image display device 100 and displayed on the respective display screen.

Additionally, as shown in FIG. 3(*a*), the third display screen 305 may include an overall image of the mobile terminal 200 showing the current display screen of the mobile terminal 200. Information on the image of the mobile terminal 200 may also be directly sent from the mobile terminal 200 to the image display device 100. Alternatively, the mobile terminal 200 can send identification information such as a model name to the image display device 100 and then the image display device can retrieve the information on the image of the mobile terminal 200 from a separate server. Furthermore, the mobile terminal 200 can transmit the information on the display screen of the mobile terminal 200 to the image display device as pixel information respective to the corresponding display screen.

Further, the third display screen 305 may only include a current screen displayed on the mobile terminal 200 and not include the overall image of the mobile terminal 200 For example, only the display screen of the mobile terminal 200 can be shown without showing the frame image of the mobile terminal 200. Therefore, the first contents stored in the mobile terminal 200 can be displayed through the third display screen 305 of the mobile terminal 200.

Similarly, as shown in FIG. 3(*b*), the image display device 100 can display the second contents in fourth display screen 307. In particular, the image display device 100 can search for various contents that are stored in a storage unit 160 (see FIG. 10) of the image display device 100, either automatically or in accordance with a user command. The image display device 100 can then display found second contents in the fourth display screen 307.

Further, the above-described second display screen 303, the third display screen 305, and the fourth display screen 307 can be displayed on the image display device in the form of an on-screen display (OSD). The second display screen 303, the third display screen 305, or the fourth display screen 307 can also be a semi-transparently formed OSD. Alternatively, when needed, each of the display screens may be separately displayed or displayed in separate forms on the screen of the image display device 100.

In addition, when the first and second contents are displayed on image display device 100, the user can store Quick Access items 500 and 501 corresponding to first and second contents in the Quick Access tray 303. For example, the user can input a command for storing the Quick Access items 500 and 501 corresponding o the first and second contents in the Quick Access tray 303.

In more detail, FIG. 3 illustrates the user touching, dragging and dropping the first and second contents from the display screens 305 and 307 to the Quick Access tray 303 to thereby store the Quick Access items 500 and 501 in the Quick Access tray 303. In addition to the Drag & Drop operation, the above-described user command may also be defined by other input operations such as pushing or pressing on the first and second contents for a long period of time. A remote controller may be used, voice commands may be used, and any other input operation may be used to add the Quick Access items 501 and/or 502 into the Quick Access tray 303. For example, the user can use diverse inputting methods such as a general remote controller, a motion remote controller, voice, gesture, a touchpad, and so on, so as to input the above-described user command.

In more detail, when the user uses a general remote controller, the user can push the direction keys provided in the general remote controller in order to move a cursor of the image display device to the first and second contents. Then, the user can push a 'Select' key to select the first and second contents. Thereafter, while pressing on the 'Select' key, the user can move the first and second contents to the Quick Access tray 303, thereby dragging and dropping the first and second contents into the Quick Access tray 303.

Furthermore, the user can press on the 'Select' key for a predetermined amount of time so that a menu for the first and second contents is displayed on the image display device 100. Subsequently, the user can input a command such as creating Quick Access items of the first and second contents through the displayed menu.

Alternatively, the user can manipulate a cursor moving in accordance with the movement of the motion remote controller so as to move the cursor on the image display device to the first and second contents. Then, the user can select the first and second contents by pushing the 'Select' key. Similarly, the user can move the first and second contents to the Quick Access tray 303 while pressing on the 'Select' key. The user can also press on the 'Select' key for a predetermined amount of time so as to input a command such as creating Quick Access items of the first and second contents.

Additionally, when the image display device 100 supports a voice recognition user interface, the user can input a voice command for creating Quick Access items of the first and second contents. In addition, when the image display device 100 supports a gesture recognition user interface, the user can input the above-described input command by performing a gesture. Similarly, when the image display device 100 includes a touchpad, the user can touch the touchpad (i.e., inputting a touch command) to input the command. Therefore, the user can input a command by using any type of inputting methods available.

Thus, based on the input command, the image display device 100 adds the Quick Access items 500 and/or 501 to the Quick Access tray 303. The created Quick Access items 500 and 501 may be configured of information on the mobile terminal 200 having the corresponding contents stored therein, icon information, execution frequency information, location information within the Quick Access tray 303, and so on. The Quick Access items 500 and 501 can also be displayed in the Quick Access tray 303 in the form of an application icon, a main display screen including a moving picture, and so on. The user can then use the Quick Access items 500 and 501 created in the Quick Access tray 303 so as to execute or playback the selected contents more easily and efficiently. This operation will be described in more detail later on.

Further, in addition to creating Quick Access items 500 and 501 based upon the user command, the image display device 100 can search for contents stored in the mobile terminal 200 connected to the image display device 100 or search for contents stored in the image display device 100, thereby automatically creating the respective Quick Access items 500 and 501. For example, among the searched contents, the image display device 100 may automatically create Quick Access items 500 and 510 respective to the contents that are currently being executed or played-back.

Figure 4:
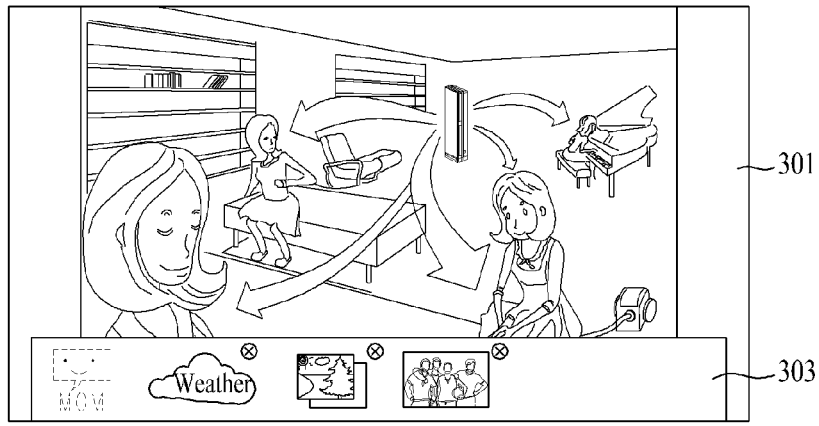
FIG. 4 to FIG. 6 respectively illustrate examples given in order to describe functions of the Quick Access tray according to an embodiment of the present invention.
Figure 4:
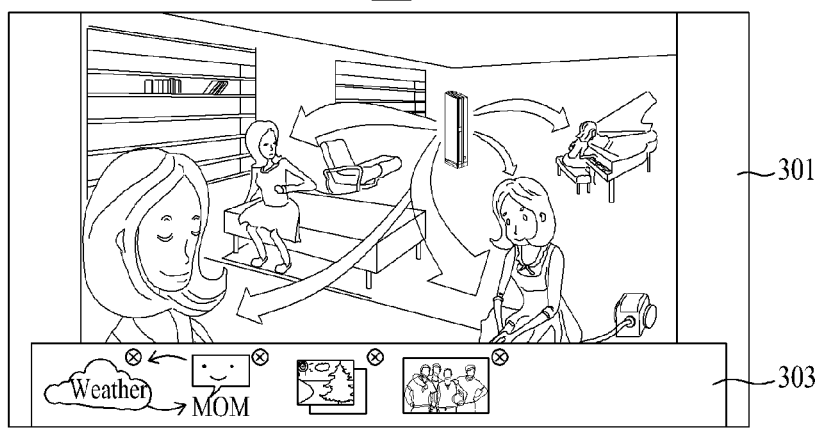
Figure 4:
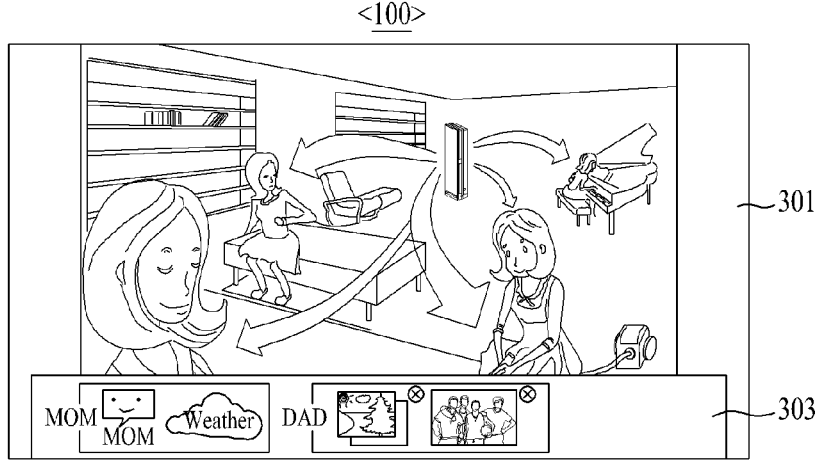
Figure 5:
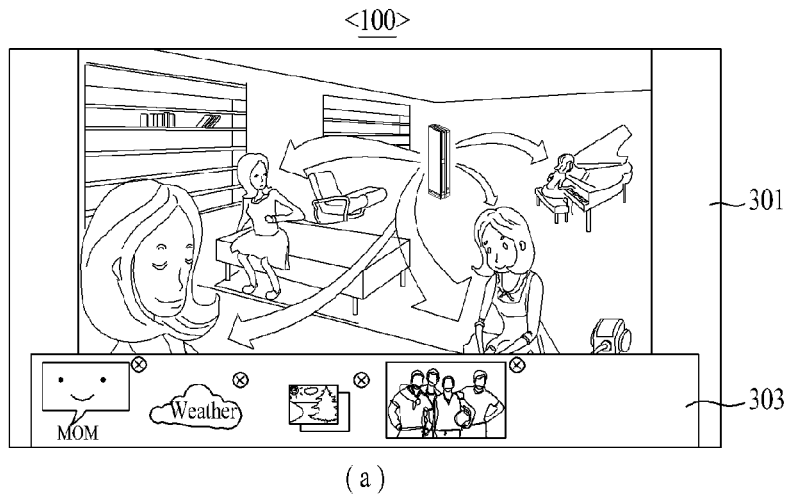
Figure 5:
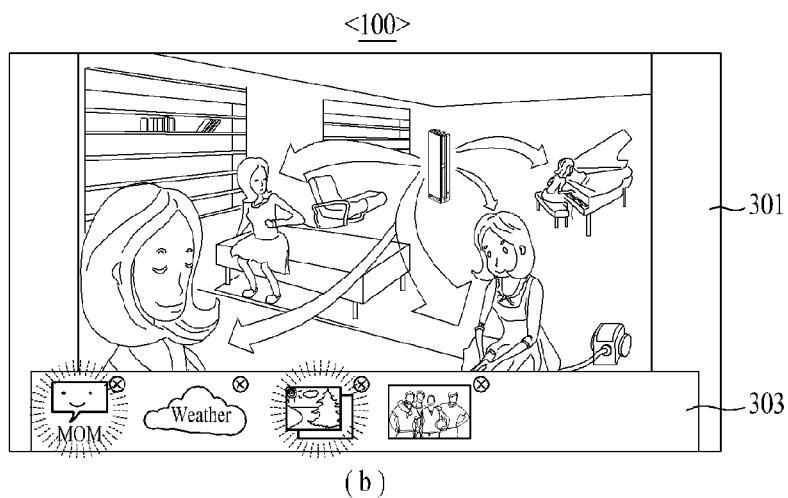
Figure 5:
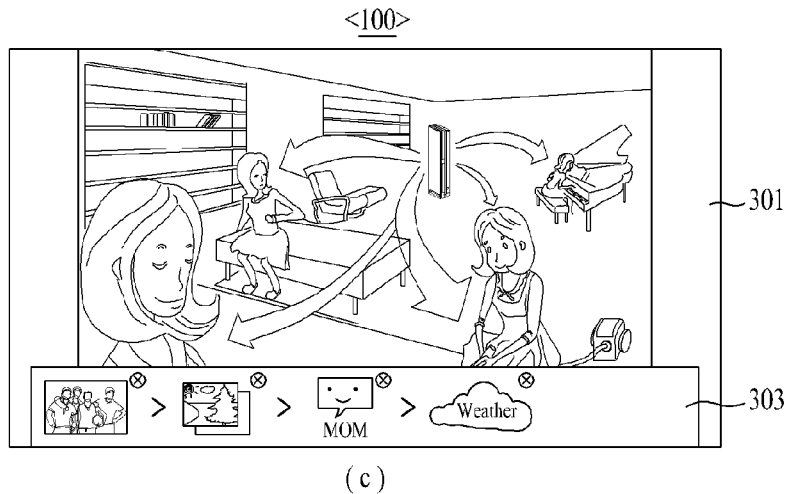
Figure 6:
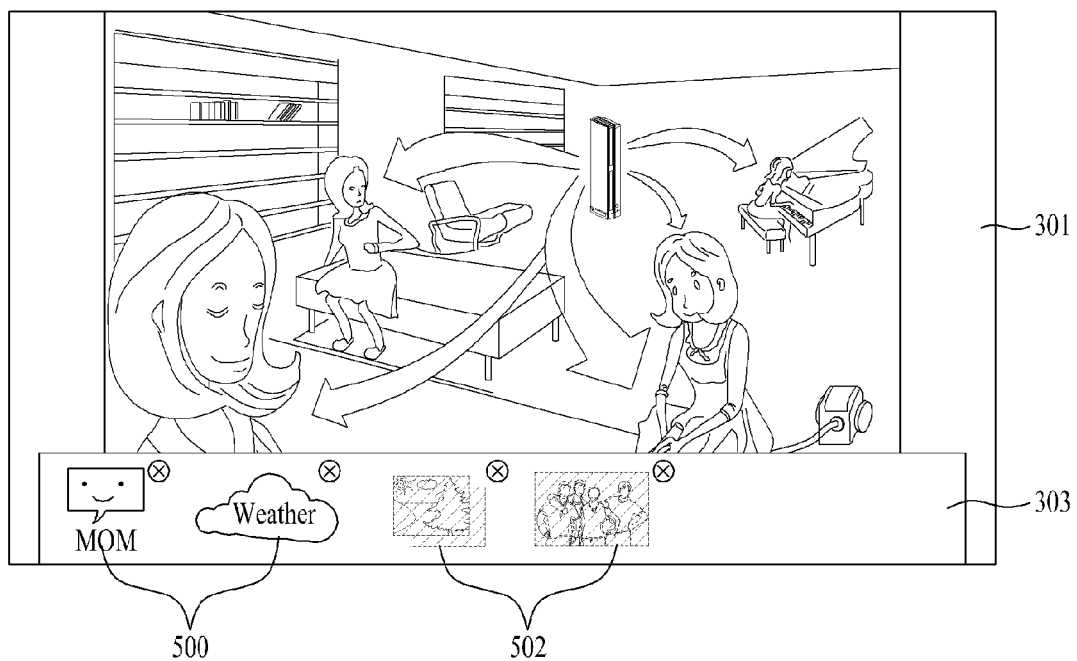

Next, FIGS. 4-6 respectively illustrate examples given in order to describe functions of the Quick Access tray according to an embodiment of the present invention. The image display device 100 according to an embodiment of the present invention provides various functions that allow the user to control the Quick Access items created in the Quick Access tray 303. More specifically, the image display device 100 provides functions that allow the user to delete, move (or relocate), and align the Quick Access items created in the Quick Access tray 303.

Among the many functions of the Quick Access tray 303, FIG. 4 shows a deletion, repositioning, and grouping of the Quick Access items. As shown in FIG. 4(a), the user can input a command requesting the image display device 100 delete a specific Quick Access item created in the Quick Access tray 303. For example, an icon indicating deletion is additionally displayed along with the Quick Access items 1. Accordingly, the user can select the deletion icon, thereby providing a function of deleting the corresponding Quick Access item 500.

FIG. 4(a) illustrates the deletion icon being an "x" mark near a corresponding Quick Access item that the user can select to delete the corresponding item. In another example, the image display device 100 can automatically delete the respective Quick Access item whenever contents for a corresponding Quick Access item are deleted from the mobile terminal 200 or the image display device 100.

Also, as shown in FIG. 4(b), the user can input a command requesting the image display device 100 provide a function that can change the positions of the Quick Access items created in the Quick Access tray 303. For example, when the user selects one Quick Access item or a plurality of Quick Access items, and inputs a command for changing the position of each selected Quick Access item, the image display device 100 provides a function changing the position of the selected Quick Access item(s) to a new position selected by the user.

Furthermore, as shown in FIG. 4(c), the user can input a command requesting the image display device 100 group the Quick Access items created in the Quick Access tray 303 by a user category or by a mobile terminal category. Although FIG. 4(c) shows an example of grouping the Quick Access items by the user category, the present invention is not limited only to the example presented herein. That is, the image display device 100 can provide a function of grouping the Quick Access tray items by diverse categories such as the mobile terminal 200 or image display device 100 having the corresponding Quick Access items stored therein, the date of creation of the corresponding Quick Access items, and so on.

Additionally, among the many functions of the Quick Access tray 303, FIG. 5 shows expansion, highlighting, and alignment of the Quick Access items. As shown in FIG. 5(a), depending upon the frequency of use of the Quick Access items created in the Quick Access tray 303, or depending upon the user's selection, the image display device 100 according to an embodiment of the present invention provides a function that can display the size of each Quick Access item 500 differently. For example, when the user selects one Quick Access item or a plurality of Quick Access items and inputs a command for changing the size of each selected Quick Access item, the image display device 100 provides a function of changing the size of the corresponding Quick Access item to a size selected by the user.

As shown in FIG. 5(b), depending upon the frequency of use of the Quick Access items created in the Quick Access tray 303, or depending upon the user's selection, the image display device 100 according to an embodiment of the present invention provides a function of highlighting the corresponding Quick Access item (i.e., applying a highlighting effect on the corresponding Quick Access item). Accordingly, the user can swiftly recognizing the corresponding Quick Access item.

As shown in FIG. 5(c), the image display device 100 according to an embodiment of the present invention provides a function for aligning the Quick Access items, based upon the frequency of use of the Quick Access items created in the Quick Access tray 303, or based upon the contents type. For example, the image display device 100 can align the Quick Access items so that the Quick Access items most frequently used by the user can be located in a left side of the Quick Access tray 303. Accordingly, the image display device 100 provides a function that can efficiently manage the Quick Access items most frequently used by the user.

Finally, among the many functions of the Quick Access tray 303, FIG. 6 shows a non-active (or inactive) indication of the Quick Access items. Depending upon whether or not the Quick Access items created in the Quick Access tray 303 can be executed, the image display device 100 according to an embodiment of the present invention provides a function of displaying (or indicating) a non-active (or inactive) status of a corresponding Quick Access item 500. For example, when a mobile terminal 200 having contents corresponding to each Quick Access item stored therein is incapable of communicating with the image display device 100, the user cannot execute the corresponding Quick Access item and/or the corresponding contents.

In this instance, the image display device 100 verifies the communication status between the image display device 100 and the mobile terminal 200, thereby verifying whether or not the Quick Access items can be executed. Accordingly, the image display device 100 marks a non-active indication on the Quick Access items that cannot be executed (see the Quick Access items 502 in FIG. 6). Thus, the user can efficiently recognizing the Quick Access items 500 that can be executed and the Quick Access items 502 that cannot be executed.

Figure 7:
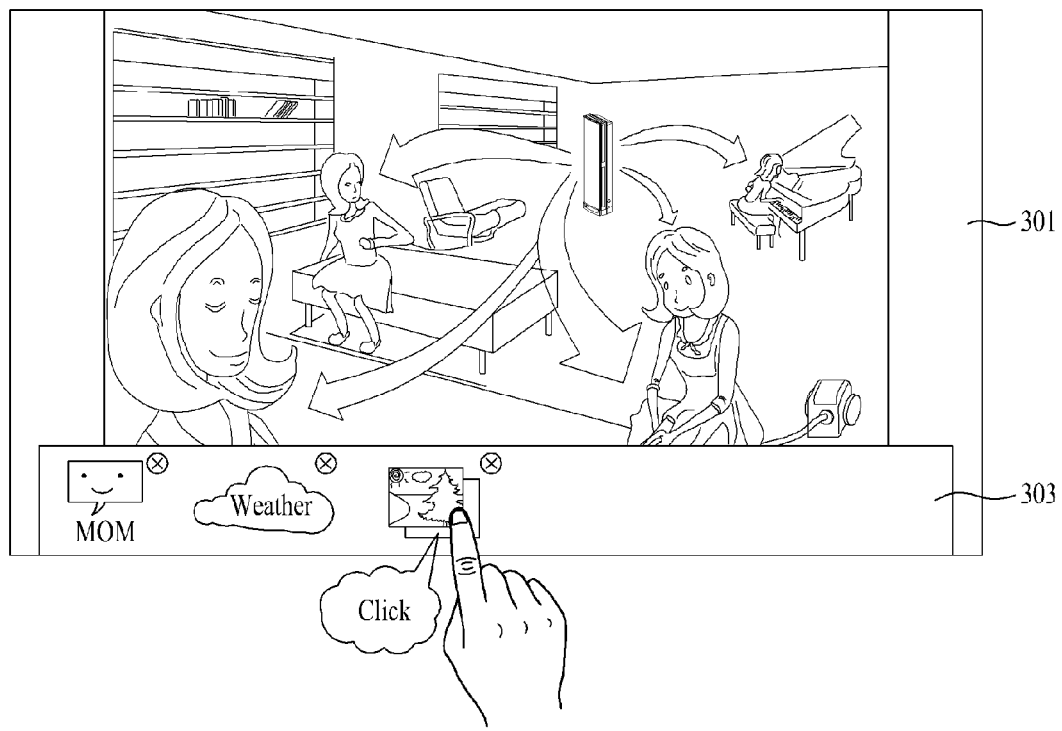
FIGS. 7 and 8 illustrate an overall view showing an exemplary execution of the Quick Access item from the image display device according to an embodiment of the present invention.
Figure 8:
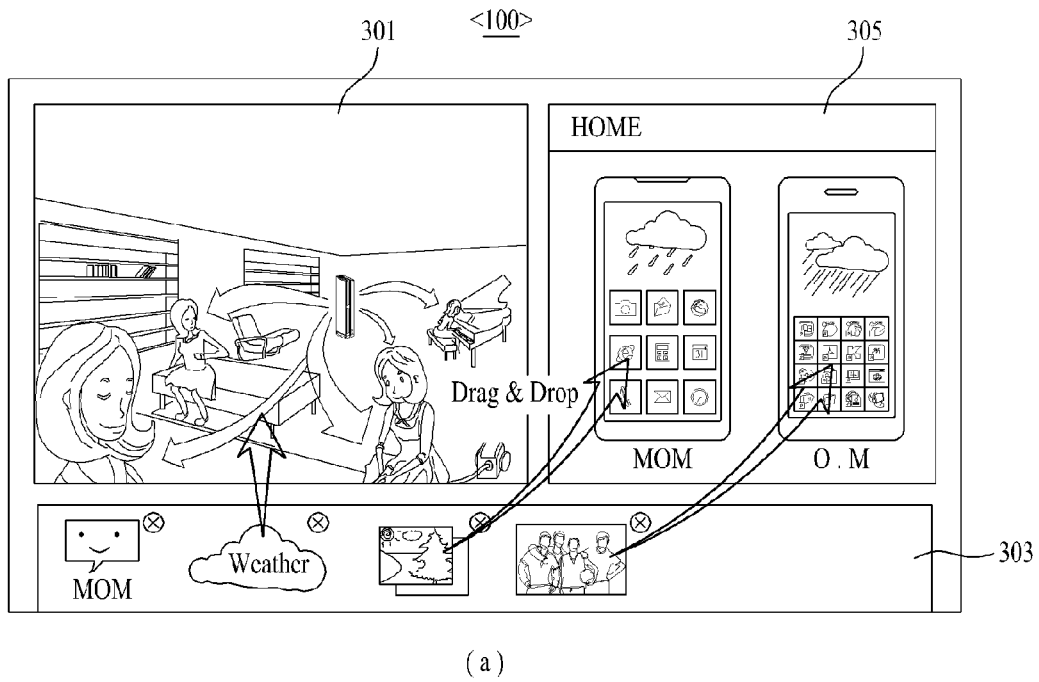
Figure 8:
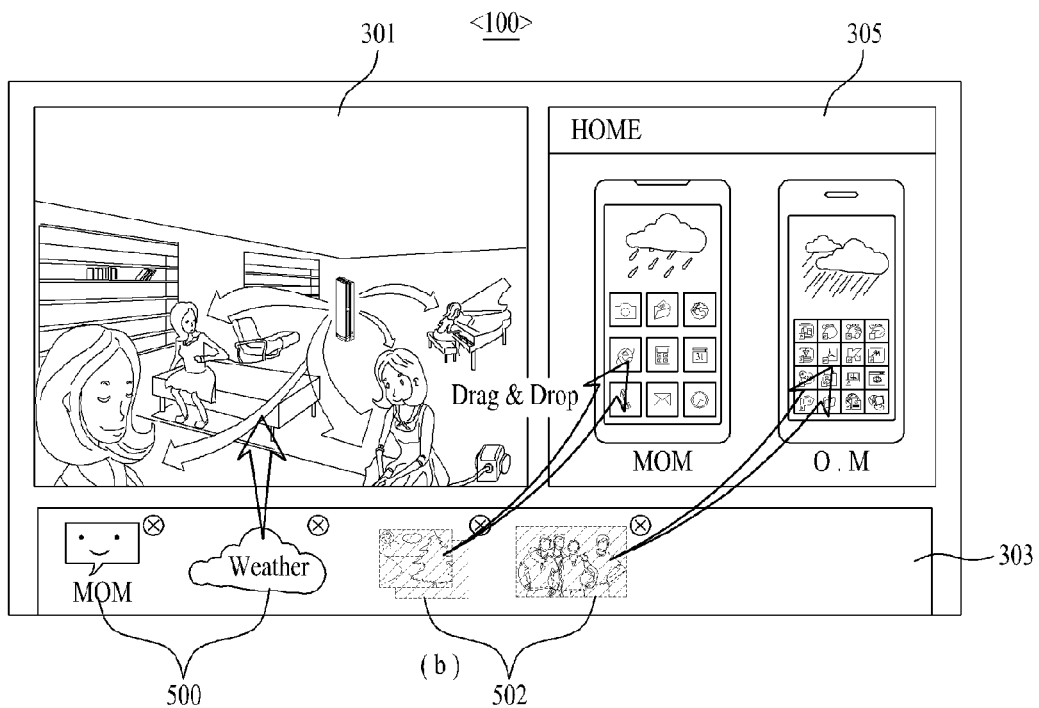

Next, FIGS. 7 and 8 are schematic views showing an execution of the Quick Access item 500 from the image display device 100 according to an embodiment of the present invention. Herein, the image display device 100 is configured so that the user can execute the Quick Access item he or she has selected. That is, the user can input a command requesting the image display device 100 execute the Quick Access items displayed in the Quick Access tray 303.

More specifically, FIG. 7 is a schematic view showing an example where the user selects a Quick Access item displayed in the Quick Access tray 303 and executes the selected Quick Access item. Further, the user command may be defined by clicking on the Quick Access items displayed in the Quick Access tray 303. In addition to the clicking operation, the above-described user command may be defined by other input operations such as pressing on the Quick Access item that is displayed in the Quick Access tray 303 for a predetermined period of time. Herein, it should be understood that the above-described examples of the user input operations will not be limited only to the examples presented in the description of the present invention.

Also, as described above, the user may use diverse inputting methods that are attached to the image display device 100 in order to input the user command. Also, the image display device 100 executes the contents corresponding to the Quick Access item selected by the user. Thereafter, the image display device 100 outputs the contents execution screen on the first display screen 301 of the image display device 100.

For example, when the Quick Access item selected by the user corresponds to the first contents stored in the mobile terminal 200, which is connected to the image display device 100, the image display device 100 transmits a command for executing the first contents to the corresponding mobile terminal 200. Thereafter, the image display device 100 receives a display screen of the first contents being executed by the mobile terminal 200 from the mobile terminal 200, and outputs the execution screen on the first display screen 301 of the image display device 100.

In another example, when the Quick Access item selected by the user corresponds to the first contents stored in the mobile terminal 200, which is connected to the image display device 100, the image display device 100 copies the first contents stored in the corresponding mobile terminal 200 and stores the copied version of the first contents in the storage unit 160 of the image display device 100. Thereafter, the image display device 100 executes the copied first contents and can output the respective execution screen on the first display screen 301.

Furthermore, when the Quick Access item selected by the user corresponds to the second contents stored in the image display device 100, the image display device 100 executes the second contents, thereby outputting the execution screen on the first display screen 301 of the image display device.

Next, FIG. 8 is a schematic view showing an example where the user selects a Quick Access item displayed in the Quick Access tray 303 and a device executing the corresponding contents so that the selected Quick Access item can be executed by the selected device. In this instance, the user command may be defined by selecting a Quick Access item and dragging and dropping the selected Quick Access item to the device so the selected Quick Access item is executed.

Referring to FIG. 8(a), when the user selects a Quick Access item and drags and drops the selected Quick Access item in the first display screen 301 of the image display device 100, the image display device 100 outputs the first or second contents corresponding to the selected Quick Access item to the first display screen 301. Further, when the user selects a Quick Access item and drags and drops the selected Quick Access item to the mobile terminal 200 displayed in the third display screen 305, the image display device 100 according to an embodiment of the present invention transmits a command to the corresponding mobile terminal 200 to direct the first and second contents corresponding to the selected Quick Access item to be displayed on the corresponding mobile terminal 200.

Additionally, when the Quick Access item selected by the user is executed, the image display device 100 may vary the execution method depending upon the type of the corresponding contents. For example, when the contents respective to the Quick Access item selected by the user correspond to a moving picture or a picture image, the moving picture or the picture image may simply be output. Alternatively, in case the contents respective to the Quick Access item selected by the user correspond to an application, the corresponding application is executed, thereby outputting the execution screen.

Furthermore, the image display device 100 may vary the execution method depending upon the function of the corresponding contents. For example, if the contents correspond to an application that transmits messages, when the user additionally selects a device that is to receive the transmitted messages, the image display device 100 can execute the message application and automatically input the transmitter and the recipient.

Moreover, FIG. 8(b) illustrates an example where the user executes a Quick Access items 502 marked with a non-active (or inactive) indication. As described above, when the Quick Access items 502 are marked with a non-active indication, and the mobile terminal 200 having the corresponding contents stored therein is turned off, or if communication between the corresponding mobile terminal 200 and the image display device cannot be performed, the corresponding contents cannot be executed. However, as shown in FIG. 8(b), when the user clicks on the Quick Access items 502 marked with a non-active indication, or when the user drags and drops the Quick Access items 502 marked with a non-active indication in the mobile terminal 200, the image display device 100 according to an embodiment of the present invention may control the respective mobile terminal 200, so that the mobile terminal having the contents corresponding to the selected Quick Access item 500 stored therein is turned on or be available for communication. For example, the image display device 100 may control the mobile terminal 200 by using a Walk On Lan (WOL), a Walk On Wireless Lan (WOWL), etc.

Figure 9:
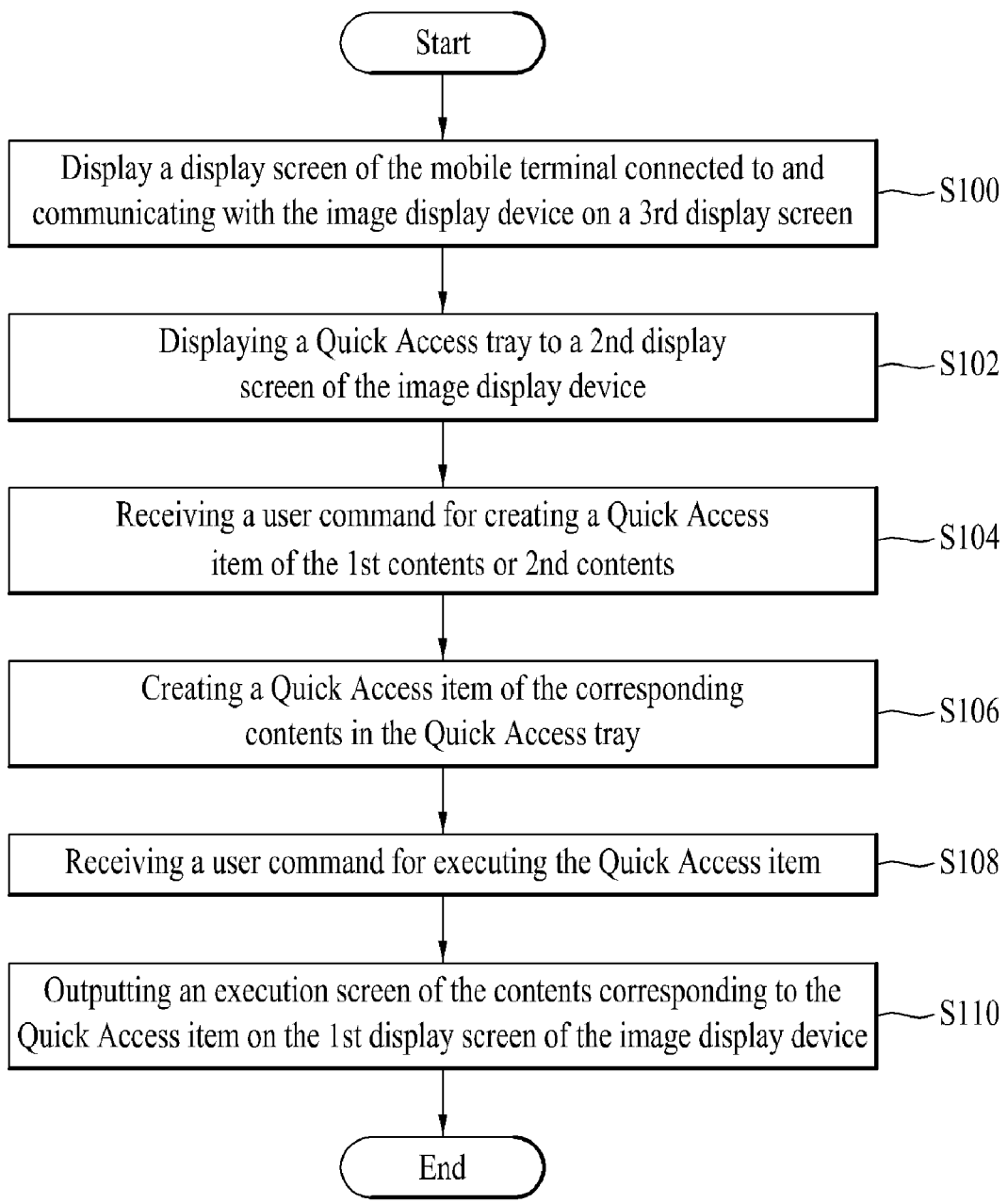
FIG. 9 illustrates a flow chart showing the process steps of a method of managing contents according to an embodiment of the present invention.

FIG. 9 is a flow chart showing a method of managing contents according to an embodiment of the present invention. As shown, the image display device 100 searches for a mobile terminal 200, which is connected to the image display device 100 and available for communication with the image display device 100, and displays the screen of the mobile terminal 200 on a third display screen of the image display device 100 (S100). As described above, in addition to the display screen of the mobile terminal 200, the image of mobile terminal 200 may be displayed.

The image display device 100 then displays a Quick Access tray 303 including the Quick Access items 500 and/or 501, on a second display screen of the image display device 100 (S102). Then, the image display device 100 receives a first user command directing the creation of a Quick Access item respective to first contents or second contents (S104). Subsequently, depending upon the received first user command, the image display device 100 creates Quick Access items respective to the contents in the Quick Access tray 303 (S106).

Thereafter, the image display device 100 receives a second user command for executing a corresponding Quick Access item displayed in the Quick Access tray 303 (S108). Finally, based upon the first user command, the image display device 100 outputs an execution screen of the Quick Access item on a first display screen of the image display device 100 (S110).

Figure 10:
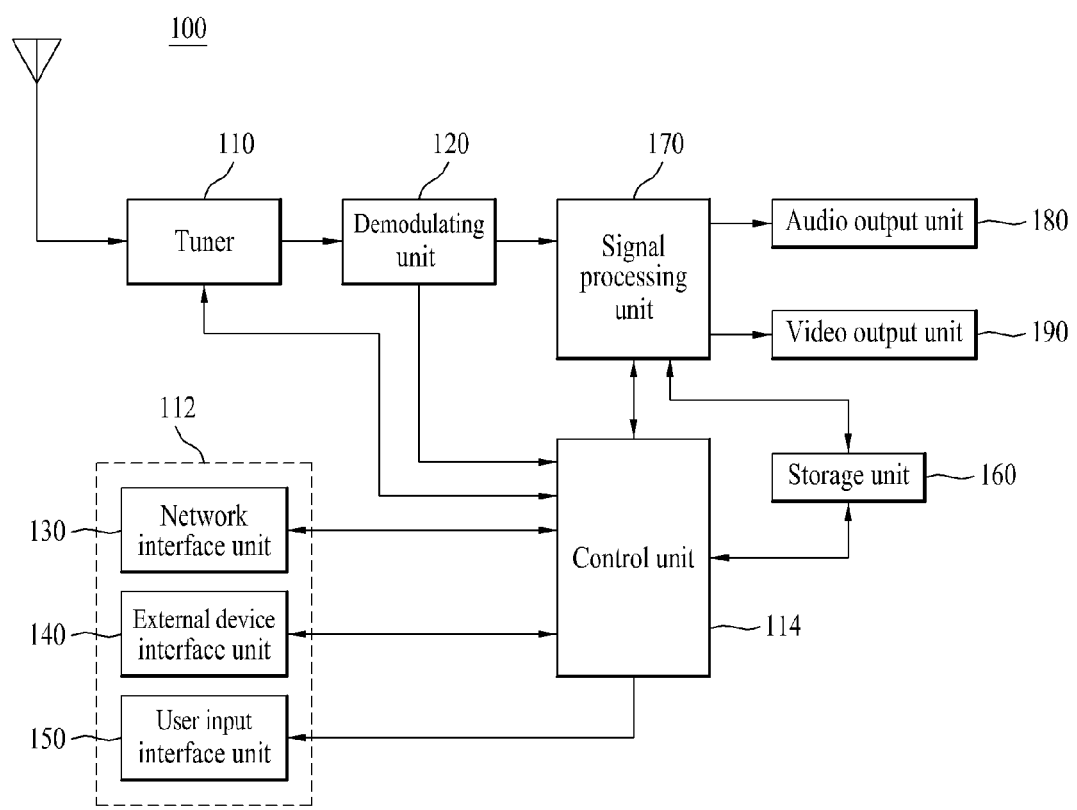
FIG. 10 illustrates a block view showing an image display device according to an embodiment of the present invention.

Hereinafter, the image display device 100, which is configured to provide the above-described method for managing contents according to an embodiment of the present invention, will now be described in detail. In particular, FIG. 10 is a block view showing the image display device 100 according to an embodiment of the present invention. Referring to FIG. 10, the image display device 100 includes a tuner 110, a demodulating unit 120, an interface unit 112, a controller 114, a storage unit 160, a signal processing unit 170, an audio output unit 180, and a video output unit 190.

Among the Radio Frequency (RF) broadcast signals that are received through an antenna, the tuner 110 selects an RF broadcast signal corresponding to a channel selected by the user or an RF broadcast signal corresponding to all of the pre-stored channels. Also, the tuner 110 converts the selected RF broadcast signal to an intermediate frequency (IF) signal or a baseband image or an audio (or voice) signal.

For example, if the selected RF broadcast signal corresponds to a digital broadcast signal, the tuner 110 converts the selected RF broadcast signal to a digital IF (DIF) signal. In addition, if the selected RF broadcast signal corresponds to an analog broadcast signal, the tuner 110 converts the selected RF broadcast signal to an analog baseband video or audio signal (CVBS/SIF). More specifically, the tuner 110 can process the digital broadcast signal or the analog broadcast signal. The analog baseband video or audio signal (CVBS/SIF) output from the tuner 110 may also be directly input to the signal processing unit 170.

Additionally, the tuner 110 can receive an RF broadcast signal of a single carrier according to an Advanced Television System Committee (ATSC) method, or receive an RF broadcast signal of multiple carriers. Meanwhile, among the RF broadcast signals that are being received through the antenna, the tuner 110 can use a channel memory function so as to sequentially select the RF broadcast signals corresponding to all of the stored broadcast channels. The selected RF broadcast signals may also be converted to an intermediate frequency (IF) signal or baseband video or audio signals.

Further, the demodulating unit 120 receives the digital IF (DIF) signal converted by the tuner 110 and performs the demodulation operation. For example, when the DIF signal being output from the tuner 110 corresponds to the ATSC method, the demodulating unit 120 performs 8-Vestigial Side Band (8-VSB) demodulation. The demodulating unit 120 may also perform channel decoding. In order to do so, the demodulator 120 may be equipped with a trellis decoder, a de-interleaver, and a Reed-Solomon decoder, thereby being capable of performing trellis decoding, de-interleaving, and Reed-Solomon decoding.

For example, if the DIF signal output from the tuner 110 corresponds to a DVB method, the demodulating unit 120 performs Coded Orthogonal Frequency Division Modulation (COFDMA). Additionally, the demodulating unit 120 may also perform channel decoding. In order to do so, the demodulating unit 120 may be equipped with a convolutional decoder, a de-interleaver, and a Reed-Solomon decoder, thereby being capable of performing convolutional decoding, de-interleaving, and Reed-Solomon decoding.

After performing demodulation and channel decoding, the demodulating unit 120 can output a stream (TS) signal. At this point, a stream signal may correspond to a signal having a video signal, an audio signal, or a data signal multiplexed therein. For example, a stream signal may correspond to an MPEG-2 Transport Stream (TS) having an MPEG-2 standard video signal and a Dolby AC-3 standard audio signal multiplexed therein. More specifically, the MPEG-2 TS may include a 4-byte header and a 184-byte payload.

The stream signal output from the demodulating unit 120 is then input to the signal processing unit 170. The signal processing unit 170 performs demultiplexing, video/audio signal processing, and so on. Thereafter, the signal processing unit 170 outputs an image to the video output unit 190 and outputs a voice (or sound) to the audio output unit 180. The interface unit 112 transmits and receives data to and from the mobile terminal 200, which is connected to the image display device 100 so as to be available for communication. Then, the interface unit 112 receives a user command. Herein, the interface unit 112 included a network interface unit 130, an external device interface unit 140, and a user input interface unit 150.

Further, the network interface unit 130 provides an interface for connecting the image display device 100 to the Internet, which includes wired/wireless networks. The network interface unit 130 may be provided with an Ethernet terminal for accessing a wired network, with Wireless LAN (WLAN or Wi-Fi), Wireless Broadband (Wibro), World Interoperability for Microwave Access (Wimax), and High-Speed Downlink Packet Access (HSDPA) communication standard terminals.

The network interface unit 130 is also configured to receive contents or data provided by the Internet, a contents provider, or a network manager, through a network. More specifically, the network interface unit 130 can receive contents such as movies, advertisements, games, VODs, broadcast signals, and so on, which are provided from the Internet or a contents provider via the network, and information associated with such contents. Also, the network interface unit 130 may receive update information and update files of firmware being provided by the network manager. In addition, the network interface unit 130 may also transmit data to the Internet, contents provider, or network manager.

Additionally, the network interface unit 130 is configured to search for a mobile terminal 200, which is connected to the image display device 100 and available for communication, and to transmit and receive data to and from the connected mobile terminal 200. Furthermore, the network interface unit 130 accesses, for example, an Internet protocol (IP) TV, so that a two-way communication can be available. Then, the network interface unit 130 can receive the processed images, sound, or data from an IPTV specific set-top box, so as to deliver the received signal to the signal processing unit 170. Thereafter, the signals processed by the signal processing unit 170 may be delivered to the IPTV specific set-top box.

In addition, the external device interface unit 140 is configured to transmit or receive data to or from an external device. In order to do so, the external device interface unit 140 may include an A/V input and output unit or a wireless communication unit. For example, the external device interface unit 140 may be connected to external devices such as Digital Versatile Disks (DVDs), Blu-rays, gaming devices, cameras, camcorders, computers (including laptop computers), and so on, via a wired/wireless connection. The external device interface unit 140 delivers video, audio, or data signals, which are input from an external source through the connected external device, to the signal processing unit 170 of the image display device 100. Also, the external device interface unit 140 can output the video, audio, or data signals, which are processed by the signal processing unit 170, to the connected external device. For this, the external device interface unit 140 may include an A/V input and output unit or a wireless communication unit.

At this point, in order to allow the video and audio signals of the external device to be input to the image display device 100, the A/V input and output unit may include a USB terminal, a Composite Video Banking Sync (CVBS) terminal, a component terminal, an S-video terminal (analog), a Digital Visual Interface (DVI) terminal, a High Definition Multimedia Interface (HDMI) terminal, an RGB terminal, a D-SUB terminal, and so on. Furthermore, the external device interface unit 140 may be connected to diverse set-top boxes through at least one of the above-described plurality of terminals, thereby performing input/output operations with the set-top box.

The user input interface unit 150 also delivers the signal input by the user to the control unit 114 or delivers a signal from the control unit 114 to the user. For example, the user input interface unit 150 may receive a user input signal such as power on/off, channel selection, screen settings, and so on, from a remote controlling device, in accordance with diverse communication methods such as a radio frequency (RF) communication method, an infrared (IR) communication method, as so on, or the user input interface unit 150 may transmit a signal from the control unit 114 to the remote controlling device.

Also, for example, the user input interface unit 150 may deliver a user input signal, which is input from a local key, such as a power key, a channel key, a volume key, a set-up key, and so on, to the control unit 114, or the user input interface unit 150 may transmit a signal from the control unit 114 to a sensing unit. Herein, the sensing unit may include a touch sensor, a voice sensor, a position sensor, a motion sensor, and so on. Therefore, the user input interface unit 150 is configured to be capable of receiving the above-described first and second user commands.

Programs for signal processing and control within the control unit 114 and the signal processing unit 170 may be stored in the storage unit 160, or the signal processed video, audio, or data signal may be stored in the storage unit 160. The storage unit 160 may also perform the function of temporarily storing the video, audio, or data signals, which are input to the external device interface unit 140. Moreover, the storage unit 160 may also store information associated to a predetermined broadcast channel through a channel memory function of a channel map. Furthermore, the storage unit 160 may store the above-described second contents.

The storage unit 160 may also be configured of at least one type of storage medium among a flash memory type, a hard disk type, a multimedia card micro type, a card-type memory (e.g., SD or XD memory), a RAM (Random Access Memory), a ROM (e.g., EPPROM) and so on. The image display device 100 may playback a file (moving picture file, still image file, music file, document file, and so on) stored in the storage unit 160 and provide the played-back file to the user. Although FIG. 10 shows an example where the storage unit 160 and the control unit 114 are provided separately, the scope of the present invention is not limited only to this example. Alternatively, the storage unit 160 may be configured to be included in the control unit 114.

The signal processing unit 170 may either demultiplex a stream, which are input through any one of the tuner 110, the demodulation unit 120, and the external device interface unit 140, or process the demultiplexed signals, thereby creating and outputting signals for video or audio output. An audio signal processed by the signal processing unit 170 may also be output to the audio output unit 180 as sound. Also, the audio signal processed by the signal processing unit 170 may be input to an external output device through the external device interface unit 140.

Furthermore, a video signal processed by the signal processing unit 170 is input to the video output unit 190, so as to be displayed as an image corresponding to the input video signal. Also, the video signal video-processed by the signal processing unit 170 may be input to an external output device through the external device interface unit 140. Moreover, the signal processing unit 170 may also be configured to be included in the control unit 114. However, the structure of the present invention is not limited only to the examples presented herein. Therefore, the signal processing unit may be configured to output video signals corresponding to the above-described first, second, third, and fourth display screen. The detailed structure of the signal processing unit 170 will be described in a later process.

The control unit 114 controls the overall operations within the image display device 100. For example, the control unit 114 controls the signal processing unit 170 in accordance with the user command received from the interface unit 112.

The control unit 114 controls the tuner 110, so that the tuner 110 can tune to (or select) an RF broadcast corresponding to a channel selected by the user or a pre-stored channel.

Also, the control unit 114 can control the image display device 100 by using a user command input through the user input interface unit 150 or by using an internal program. For example, the control unit 114 controls the tuner 110 so that a signal of a selected channel can be input in accordance with a predetermined channel selection command received through the user input interface unit 150. Also, the control unit 114 controls the signal processing unit 170 so as to process video, audio, or data signals of the selected channel. The control unit 114 controls the signal processing unit 170 so that the channel information selected by the user can be output along with the processed video or audio signals through the video output unit 190 or the audio output unit 180.

Additionally, the control unit 114 controls the signal processing unit 170 so that video signals or audio signals, which are generated from an external device, e.g., a camera or camcorder, and which are received through the external device interface unit 140, can be output through the video output unit 190 or the audio output unit 180, in accordance with an external device video playback command, which is received through the user input interface unit 150.

Meanwhile, the control unit 114 can control the video output unit 190 so that an image can be displayed through the signal processing unit 170. For example, the control unit 114 can control the video output unit 190 so that a broadcast video or image being input through the tuner 110, an external input video or image being input through the external device interface unit 140, a video or image being input through the network interface unit 130, or a video or image stored in the storage unit 160 can be displayed on the video output unit 190.

In addition, in order to perform the method of managing contents of the above-described image display device 100, the control unit 114 controls the above-described elements. More specifically, the control unit 114 can control the network interface unit 130 so as to search for a mobile terminal 200 that is connected to the image display device 100 and that is available for communication with the image display device 100, and to receive information of the corresponding mobile terminal 200. Also, the control unit 114 controls the signal processing unit 170 so that a screen of the mobile terminal 200 can be output to the third display screen of the image display device 100, and that a Quick Access tray 303 displaying the Quick Access items 500 and 501 can be output to the second display screen of the image display device 100, by using the received information on the mobile terminal 200.

Moreover, the control unit 114 controls the network interface unit 130 so as to receive information on the contents selected by the user from the image display device 100. In addition, the control unit 114 controls the signal processing unit 170 so as to display the Quick Access items corresponding to the information on the received contents in the Quick Access tray 303.

Furthermore, the control unit 114 controls the network interface unit 130 so as to transmit a command for executing the contents corresponding to the selected Quick Access item to the mobile terminal 200. Thereafter, the control unit 114 controls the network interface unit 130 so that information on an execution screen information of the corresponding contents can be received by the mobile terminal 200. Finally, the control unit 114 controls the signal processing unit 170 so that the received contents execution screen can be output to the first display screen 301 of the image display device 100.

The audio output unit 180 receives an audio-processed signal, e.g., a stereo signal, a 3.1 channel signal, or a 5.1 channel signal, from the signal processing unit 170, thereby outputting the received audio-processed signal as sound. A sound output unit 185 may be realized in diverse forms of speakers.

The video output unit 190 converts the video signal, data signal, OSD signal, control signal, which are processed by the signal processing unit 170, and converts the video signal, data signal, control signal, which are received by the external device interface unit 140 so as to generate a Drive signal. The video output unit 190 may be configured of a PDP, an LCD, an OLED, a flexible display, and so on, which can provide three dimensional (3D) display. Meanwhile, the video output unit 190 is configured as a touchscreen. Therefore, in addition to being used as an output device, the video output unit 190 may also be used as an input device.

Meanwhile, as described above, in order to detect or sense the user's gesture, a sensing unit equipped with any one of a touch sensor, a voice sensor, a position sensor, and a motion sensor may be further included in the image display device 100. A signal sensed by the sensing unit is then delivered to the control unit 114 through the user input interface unit 150.

Meanwhile, the image display device 100 shown in FIG. 10 is merely an example given to describe the present invention. Therefore, depending upon the specification of the image display device 100 that is actually embodied, some elements may be integrated, added, or omitted. More specifically, two or more elements may be integrated to a single element, or a single element may be segmented to two or more elements. Also, the functions performed by each block are also examples given to facilitate the description of the present invention. Therefore, the scope of the present invention is not limited only to the detailed operations or devices proposed herein.

Figure 11:
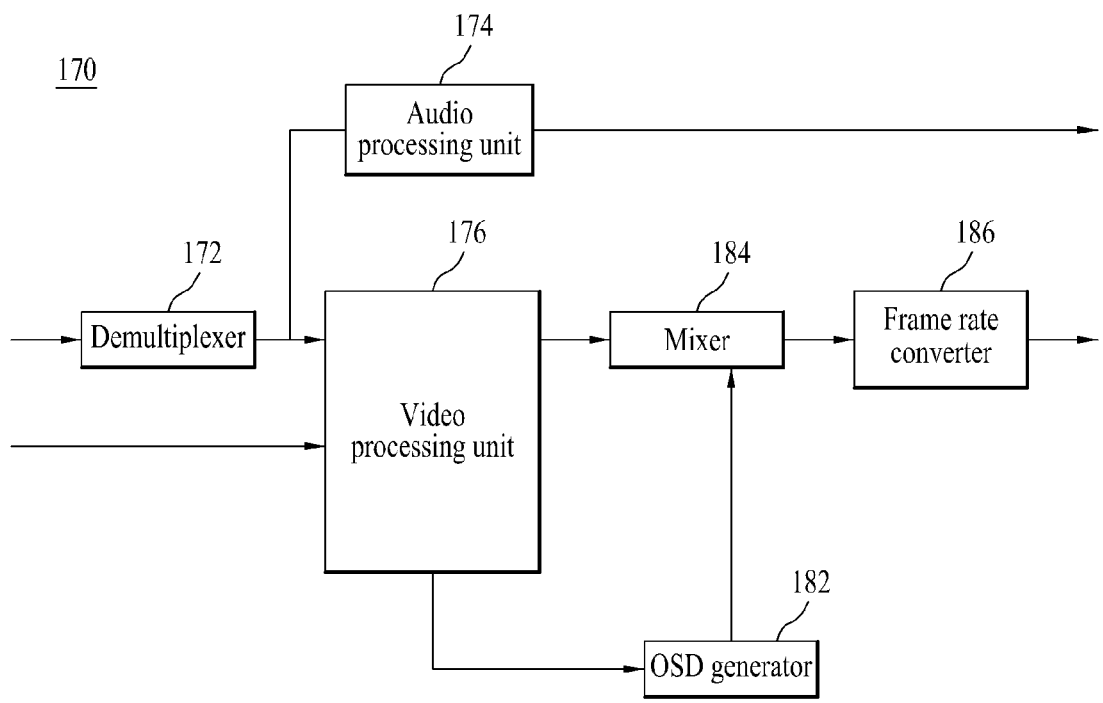
FIG. 11 illustrates a block view showing a more detailed structure of a signal processing unit of FIG. 10.

Next, FIG. 11 illustrates a block view showing a more detailed structure of the signal processing unit 170 of FIG. 10. As shown in FIG. 11, the signal processing unit 170 includes a demultiplexer 172, a video processing unit 176, an audio processing unit 174, an OSD generator 182, a mixer 184, and a frame rate converter 186. Additionally, the signal processing unit 170 may further include a data processing unit.

The demultiplexer 172 demultiplexes an input stream. For example, when an MPEG-2TS is input, the demultiplexer 172 demultiplexes the input MPEG-2 TS so that the input stream can be divided into video signal, an audio signal, and a data signal. Herein, the stream signal input to the demultiplexer 172 may correspond to a stream signal that is output from the tuner 110, or the demodulating unit 120, or the external device interface unit 140.

The audio processing unit 174 may perform audio-processing on the demultiplexed audio signal. For this, the audio processing unit 174 is equipped with diverse decoders in order to decode the audio signal, which is coded in diverse methods. The video processing unit 176 decodes the demultiplexed video signal. The video processing unit 176 may also be equipped with decoders of diverse standards. For example, the video processing unit 176 may be equipped with at least one of an MPEG-2 decoder, an H.264 decoder, an MPEC-C decoder (MPEC-C part 3), an MVC decoder, and an FTV decoder. Also, the video processing unit 176 may include a stereoscopic video decoder for decoding stereoscopic image signals.

The OSD generator 182 generates an OSD signal in accordance with a user input or by itself. For example, based upon a user text input signal, the OSD generator 182 generates a signal for displaying diverse information in the form of graphics or text on the display screen of the video output unit 190. As a user interface screen of the image display device 100 the generated OSD signal may include diverse data, such as various menu screens, a Quick Access tray 303 screen, widgets, and icons.

The mixer 184 mixes the OSD signal generated from the OSD generator 182 with the video signal that is video-processed and decoded by the video processing unit 176. The mixed video signal is provided to the frame rate converter 186, and the frame rate converter 186 converts the frame rate of the input video (or image).

As described above, the image display device and method of managing contents using the same according to an embodiment of the present invention have the following advantages. First, the user can efficiently create a "Quick Access" menu for the contents stored in the mobile terminal or the image display device. Also, the user can swiftly and promptly use the contents stored in the mobile terminal or the image display device. Furthermore, contents stored in the mobile terminal or the image display device may be efficiently output from the mobile terminal connected to the image display device. Thus, the user convenience is enhanced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of managing contents using an image display device, the method comprising:

connecting, via a network interface unit of the image display device, a mobile terminal to the image display device;

displaying, on a display unit of the image display device, a first display screen, a second display screen and a third display screen, the first display screen including an input stream processed by the image display device, the second display screen including a Quick Access tray, and the third display screen including at least one first content stored in the mobile terminal and at least one second content stored in the image display device;

receiving, via an input unit of the image display device, a first input command indicating a selection of one of the first or second contents and indicating placing of the selected one of the first or second contents in the displayed Quick Access tray;

creating, via a controller of the image display device, at least one Quick Access item corresponding to the selected one of the first or second contents in the displayed Quick Access tray based on the first input command; receiving, via the input unit, a second input command indicating a selection of the created Quick Access item; and executing a content corresponding to the selected Quick Access item on one of the first and third display screens of the image display device based on the second input command, wherein:

a Quick Access item corresponding to the first content of the mobile terminal is represented in the displayed Quick Access tray as being in a non-active state in response to the mobile terminal being turned off, in response to a selection of the Quick Access item represented in the non-active state, the controller of the image display device turns on the mobile terminal, executes the first content of the mobile terminal in the image display device and displays the first content of the mobile terminal on the first display screen of the image display device, and wherein the Quick Access item comprises information of the mobile terminal, execution frequency information of the first content, and location information within the Quick Access tray.

2. The method of claim 1, further comprising:
displaying a first image for indicating the mobile terminal includes at least one first content or a second image for depicting a real shape of the mobile terminal in the third display screen.

3. The method of claim 1, wherein the first input command is a dragging and dropping input command from the third display screen to the second display screen.

4. The method of claim 1, further comprising:
automatically creating at least one Quick Access item in the Quick Access tray corresponding to the at least one first content stored in the mobile terminal or the at least one second content stored in the image display device.

5. The method of claim 1, further comprising:
receiving a third input command indicating a selection of the Quick Access item displayed in the Quick Access tray; and
performing at least one of a) deleting the selected Quick Access item, b) changing a position of the Quick Access item, and c) changing a displayed size of the Quick Access item based on the third input command.

6. The method of claim 1, further comprising:
realigning, expanding, or highlighting the Quick Access item depending upon a frequency of use of the Quick Access item.

7. The method of claim 1, wherein the second input command is a dragging and dropping input command dropping the Quick Access item to the first or third display screens.

8. The method of claim 7, wherein when the second input command is the dragging and dropping input command dropping the Quick Access item to the first display screen, the executing step displays an output of the executing application in the first display screen, and when the second input command is the dragging and dropping input command dropping the Quick Access item to the third display screen, the executing step control the mobile terminal to execute the application and display the output of the executing application on the mobile terminal.

9. The method of claim 1, wherein the second and third display screens are displayed on the first display screen in the form of on-screen displays (OSDs).

10. An image display device, comprising:
a network interface unit configured to connect a mobile terminal to the image display device;
a display unit configured to display a first display screen, a second display screen and a third display screen, the first display screen including an input stream processed by the image display device, the second display screen including a Quick Access tray, and the third display screen including at least one first content stored in the mobile terminal and at least one second content stored in the image display device; and
a controller configured to create at least one Quick Access item corresponding to the selected one of the first or second contents in the displayed Quick Access tray based on a first input command, to receive a second input command indicating a selection of the created Quick Access item, and to execute a content corresponding to the selected Quick Access item on one of the first and third display screens of the image display device based on the second input command,
wherein:
a Quick Access item corresponding to the first content of the mobile terminal is represented in the displayed Quick Access tray as being in a non-active state in response to the mobile terminal being turned off, and
in response to a selection of the Quick Access item represented in the non-active state, the controller of the image display device turns on the mobile terminal, executes the first content of the mobile terminal in the image display device and displays the first content of the mobile terminal on the first display screen of the image display device, and wherein the Quick Access item comprises information of the mobile terminal, execution frequency information of the first content, and location information within the Quick Access tray.

11. The image display device of claim 10, wherein the display unit is further configured to display a first image indicating the mobile terminal includes the at least one first content or a second image for depicting a real shape of the mobile terminal in the third display screen.

12. The image display device of claim 10, wherein the first input command is a dragging and dropping input command from the third display screen to the second display screen.

13. The image display device of claim 10, wherein the controller is further configured to automatically create at least one Quick Access item in the Quick Access tray corresponding to the at least one first content stored in the mobile terminal or the at least one second content stored in the image display device.

14. The image display device of claim 10, wherein the controller is further configured to receive a third input command indicating a selection of the Quick Access item displayed in the Quick Access tray, and to perform at least one of a) deleting the selected Quick Access item, b) changing a position of the Quick Access item, and c) changing a displayed size of the Quick Access item based on the third input command.

15. The image display device of claim 10, wherein the controller is further configured to realign, expand, or highlight the Quick Access item depending upon a frequency of use of the Quick Access item.

16. The image display device of claim 10, wherein the second input command is a dragging and dropping input command dropping the Quick Access item to the first or third display screens.

17. The image display device of claim 16, wherein when the second input command is the dragging and dropping input command dropping the Quick Access item to the first display screen, the display unit is further configured to display an output of the executing application in the first display screen, and when the second input command is the dragging and dropping input command dropping the Quick Access item to the third display screen, the controller is further configured to control the mobile terminal to execute the application and display the output of the executing application on the mobile terminal.

18. The image display device of claim 10, wherein the display unit is further configured to display the second and third display screens on the first display screen in the form of on-screen displays (OSDs).

19. The method of claim 1, wherein the input unit comprises a motion remote control for inputting a motion gesture corresponding to at least one of the first and second inputs.

20. The image display device of claim 10, wherein the input unit comprises a motion remote control for inputting a motion gesture corresponding to at least one of the first and second inputs.

21. The method of claim 1, wherein the third display screen displays a content currently displayed on the mobile terminal.

22. The image display device of claim 10 wherein the third display screen displays a content currently displayed on the mobile terminal.

* * * * *